No. 817,452. PATENTED APR. 10, 1906.
N. E. SKINNER.
STRAINER.
APPLICATION FILED OCT. 27, 1905.
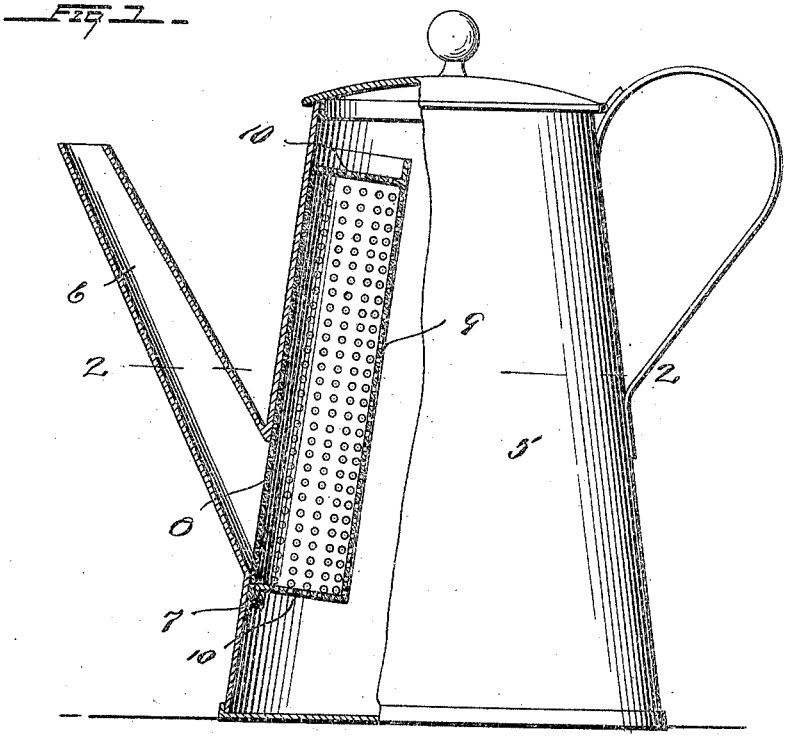
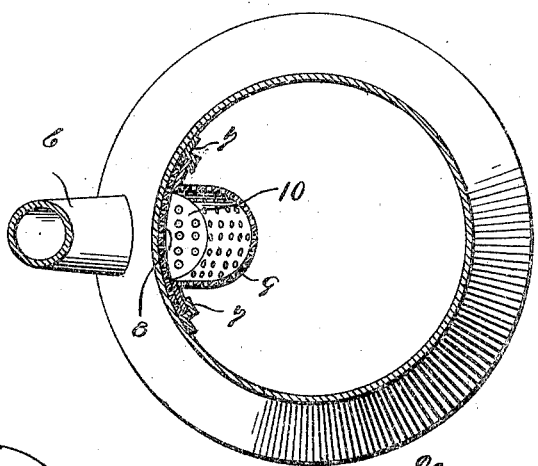
WITNESSES:
INVENTOR
Nancy E. Skinner
BY
Milo B. Stevens and Co.
Attorneys.

UNITED STATES PATENT OFFICE.

NANCY ELIZABETH SKINNER, OF WEST LORNE, CANADA.

STRAINER.

No. 817,452.        Specification of Letters Patent.        Patented April 10, 1906.

Application filed October 27, 1905. Serial No. 284,663.

*To all whom it may concern:*

Be it known that I, NANCY ELIZABETH SKINNER, a citizen of the Dominion of Canada, residing at West Lorne, in the county of Elgin and Province of Ontario, Canada, have invented certain new and useful Improvements in Strainers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to coffee or tea pots, and more particularly to a strainer therefor embodying certain novel features of construction hereinafter described and claimed.

In the accompanying drawings, Figure 1 is an elevation of the invention, partly in section. Fig. 2 is a horizontal section on the line 2 2 of Fig. 1.

Referring specifically to the drawings, 5 denotes a coffee or tea pot having the usual pouring-spout 6. On the inside of the pot are secured guide-strips 7, which receive a fine strainer 8, extending over the inlet of the spout. The guide-strips also receive a second and coarse strainer 9, which is spaced from the strainer 8, leaving a moderately large space between the strainers. Both strainers extend nearly the entire length of the pot, so that a large strainer-surface is had and a large amount of liquid is permitted to pass into the space between the two strainers. The effect of this is that a continuous pour can be obtained. The strainer 9 keeps the leaves, grounds, &c., from the strainer 8, while the latter strainer catches anything that may have passed the former. This arrangement effectively prevents clogging. At the top and bottom of the strainer 9 are perforated plates 10, which extend to the wall of the pot, so that the space between the strainers is entirely inclosed. Both strainers can be readily removed from the pot for cleaning.

Having thus described my invention, what is claimed as new, and desired to be secured by Letters Patent, is—

The combination with a vessel having a pouring-spout, of guide-strips inside the pot, a strainer supported by said guide-strips and extending over the spout-inlet, and a second and bow-shaped strainer supported by the aforesaid guide-strips, and having at the top and bottom perforated plates extending from said strainer over against the wall of the pot.

In testimony whereof I affix my signature in presence of two witnesses.

NANCY ELIZABETH SKINNER.

Witnesses:
     ELIZABETH J. PRICE,
     LILLIAN A. SPARKLIN.